(12) United States Patent
Boucadair et al.

(10) Patent No.: US 9,197,480 B2
(45) Date of Patent: Nov. 24, 2015

(54) METHOD AND SYSTEM FOR THE TRANSMISSION OF DATA BETWEEN NODES ATTACHED TO SEPARATE IP ENVIRONMENTS BY ALLOCATION OF FICTIONAL ADDRESSES

(75) Inventors: Mohamed Boucadair, Caen (FR); Yoann Noisette, Mau sur Ome (FR)

(73) Assignee: Orange, Paris (FR)

( * ) Notice: Subject to any disclaimer, the term of this patent is extended or adjusted under 35 U.S.C. 154(b) by 744 days.

(21) Appl. No.: 12/224,569

(22) PCT Filed: Feb. 15, 2007

(86) PCT No.: PCT/FR2007/050806
§ 371 (c)(1),
(2), (4) Date: Jun. 8, 2009

(87) PCT Pub. No.: WO2007/099247
PCT Pub. Date: Sep. 7, 2007

(65) Prior Publication Data
US 2009/0304025 A1    Dec. 10, 2009

(30) Foreign Application Priority Data
Feb. 28, 2006 (FR) ..................... 06 50682

(51) Int. Cl.
H04L 12/28 (2006.01)
H04L 29/06 (2006.01)

(52) U.S. Cl.
CPC .......... *H04L 29/06027* (2013.01); *H04L 29/06* (2013.01); *H04L 65/105* (2013.01); *H04L 65/1006* (2013.01); *H04L 69/16* (2013.01)

(58) Field of Classification Search
CPC ............... H04L 29/0653; H04L 12/56; H04L 2012/5667

USPC ........ 370/389, 349, 392, 395.2, 395.3, 395.5, 370/395.52, 401, 402
See application file for complete search history.

(56) References Cited

U.S. PATENT DOCUMENTS

| 6,118,784 | A | * | 9/2000 | Tsuchiya et al. | 370/401 |
| 2004/0246991 | A1 | * | 12/2004 | Tsuzuki et al. | 370/466 |
| 2005/0185672 | A1 | | 8/2005 | Endo et al. | |
| 2005/0243840 | A1 | | 11/2005 | Sivalingam | |
| 2006/0015647 | A1 | * | 1/2006 | Kang et al. | 709/245 |

(Continued)

FOREIGN PATENT DOCUMENTS

EP    1 515 508    3/2005

OTHER PUBLICATIONS

Camarillo Ericsson et al., "Usage of the Session Description Protocol (SDP) Alternative Network Address Types (ANAT) Semantics in the Session Initiation Protocol (SIP)", IETF Standard, Internet Engineering Task Force, Jun. 2005.
Camarillo Ericsson et al., "The Alternative Network Address Types (ANAT) Semantics for the Session Description Protocol (SDP) Grouping Framework", IETF Standard, Internet Engineering Task Force, Jun. 2005.

(Continued)

*Primary Examiner* — Brenda H Pham
(74) *Attorney, Agent, or Firm* — Cozen O'Connor (57) ABSTRACT

A method of transmitting data between nodes of a network, a node being attached to an IP environment calls its source environment. This method comprises a step of assigning a user agent included in one of said nodes, a fake address in an IP environment different from that of said source environment; and a step of presenting said fake address and a source address of said user agent in said source environment when setting up communication with a remote node.

16 Claims, 3 Drawing Sheets

(56) References Cited

U.S. PATENT DOCUMENTS

2006/0140213 A1* 6/2006 Hwang et al. .................. 370/466
2006/0215657 A1* 9/2006 Lee et al. ....................... 370/389
2006/0251088 A1* 11/2006 Thubert et al. ................. 370/401
2007/0162744 A1* 7/2007 Hoshino et al. ................ 713/156

OTHER PUBLICATIONS

B. Aboba et al, "Radius and Ipv6", IETF Standard, Internet Engineering Task Force, IETF, Aug. 2001.

* cited by examiner

FIG. 1a

( PRIOR ART )

FIG. 1b

( PRIOR ART )

METHOD AND SYSTEM FOR THE TRANSMISSION OF DATA BETWEEN NODES ATTACHED TO SEPARATE IP ENVIRONMENTS BY ALLOCATION OF FICTIONAL ADDRESSES

RELATED APPLICATIONS

This is a U.S. national stage under 35 USC 371 of application No. PCT/FR2007/050806, filed on Feb. 15, 2007.

This application claims the priority of French patent application no. 06/50682 filed Feb. 28, 2007, the content of which is hereby incorporated by reference.

FIELD OF THE INVENTION

The field of the invention is that of telecommunications, more particularly that of IP telephony.

BACKGROUND OF THE INVENTION

Internet Protocol (IP) networks are increasingly used as universal supports for a multitude of services and applications. The IP has had a federator role for many operators opting for this protocol to mutualize previously disparate service offers.

The IPv4 version of the Internet Protocol has been in use for some years.

To satisfy constraints imposed by such communications services and more particularly to accommodate increased requirements in terms of addresses, operators and network equipment manufacturers have united to specify a new generation communications protocol, known as IPv6, defined by specifications and analysis documents that are now at a sufficiently advanced stage of development for it to be possible to envisage operational deployment in the operators' networks.

Nevertheless, the introduction of this new generation protocol is causing significant problems linked to the need to guarantee interoperability and interworking between the IPv6 protocol and the IPv4 protocol already deployed in IP networks. In the current state of the art solutions to those problems have been identified, but they have the disadvantage that they are operative not only at a "service" level (in particular in the application layer) but also at a "transport" level (in the IP layer). In the transport layer, mechanisms have been proposed and even standardized by the Internet Engineering Task Force (IETF), such as the NAT-PT (Network Address Translation—Protocol Translation) technique and various tunneling techniques that encapsulate IPv6 data in IPv4 datagrams or vice-versa.

Furthermore, architectures and service platforms must be updated and adapted to enable interworking between clients situated in IP environments of different types (IPv4 and IPv6) as transparently as possible for the end user.

Among other multimedia activities, the IETF has standardized the Session Initiation Protocol (SIP), the main functions of which are initiating, modifying, and terminating multimedia sessions. The SIP is an interesting example for application of the present invention. It is based on the Service Description Protocol (SDP) for producing a description of parameters relating to the session concerned. Once negotiation between two parties to a call has succeeded, the parties can exchange media streams by activating a Real-time Transport Protocol (RTP). RTP session parameters are prenegotiated via SIP signaling messages, notably in the SDP part. They are mainly termination addresses and port numbers to be used at either end of a communications link to be set up.

Figure 1A:
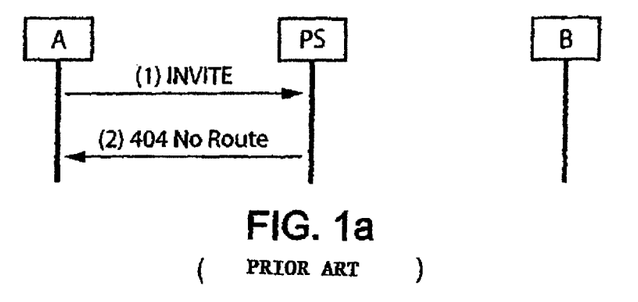
FIGS. 1a and 1b, already commented on in relation to the prior art, show two examples of failure to set up a communications session between two user agents A and B attached to IP networks of different kinds.

Since a first version of the SIP was described in Request For Comments (RFC) 2543 it has been compatible with IPv6. In theory, an implementation of the SIP easily decodes IPv4 and IPv6 addresses, which can be introduced into specific fields such as a "CONTACT" header or headers of the SDP part. However, the presence of such addresses can prevent SIP calls being set up if both terminals cannot be contacted in the same IP environment, i.e. if one has an IPv4 address and the other an IPv6 address. Thus when an IPv4 user agent A initiates an SIP session with an IPv6 user agent registered with an IPv4 location server (also known as a "Registrar" R), the resulting exchange of SIP messages is as shown in FIG. 1a, in which a first user agent A seeking to contact a second user agent B sends an "INVITE" message to a proxy server PS using an IPv4 address specific to it. Here the proxy server PS is attached to an IPv4-only environment. Once the message has been received by the proxy server PS, the proxy server submits a query to a location server, also known as a registration server, to recover the address of the second user agent B. Under the present assumption, that address is an IPv6 address and the proxy server PS does not know a route to that destination, given that the proxy server PS is of IPv4-only type. An error message is then sent to the user agent A indicating that it is impossible to set up an SIP session between the first and second user agents A and B. This error message is the "(2) 404 No Route" message shown in FIG. 1a.

Figure 1B:
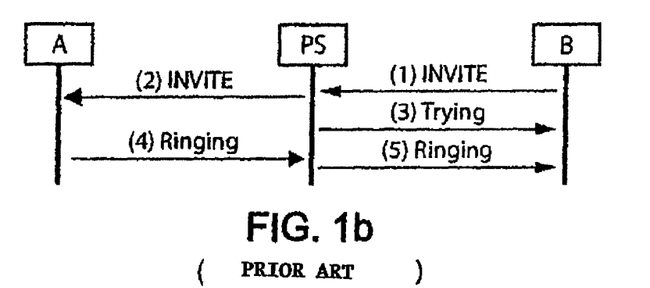

If it is now assumed that the proxy server PS can nevertheless contact the location address of the first user agent A as well as that of the second user agent B, another exchange of SIP messages takes place, with the second user agent B attempting to call the first user agent A, as shown in FIG. 1b.

In this situation, the proxy server PS routes an "INVITE" message received form the second user agent B to the location address of the first user agent A. This "INVITE" message contains an SDP offer describing, in addition to the codecs (coders/decoders) offered by the first user agent B, an RTP port number and an address that the second user agent B can use to send and receive RTP streams. In FIG. 1b, that address is an IPv6 address. Thus when the user agent A receives this "INVITE" message, it can only refuse to open the session because it is an IPv4 client. Depending on how it is implemented, it can at best send back an error message indicating that it does not support network connections to the IP address of the user agent B. Thus SIP sessions cannot be set up in either of the above examples described with reference to FIGS. 1a and 1b.

Coexistence of IP addresses of different types can affect calls other than those graphically represented and described above. Thus calls to Dual Stack (DS) clients can also fail to terminate in the exchange of media streams, DS user agents being able to process both IPv4 and IPv6 address types. This is because the basic SIP provides for indicating only one IP address for sending or receiving media streams. To overcome this problem, RFC 4092 introduces new semantic features including an "sdp-anat" flag to enable a user agent to announce and/or discover one or more address types. Thus DS user agents can indicate in their STP offer both their IPv4 address and their IPv6 address. By means of this technique, all calls from or to a DS user agent to or from single-version clients (i.e. clients compatible only with the IPv4 protocol or only with the IPv6 protocol) can terminate in successful SIP sessions. However, these semantic features are reserved exclusively for DS user agents, and therefore offer no solution for successfully setting up sessions between single-version clients.

In the particular situation where two nodes at the ends of a communications link intended to convey a given call are single-version nodes, the SIP telephone service operator concerned can use application level gateway (ALG) applications for modifying SDP offers to ensure consistency between the address type supported and the type contained in the received SIP messages. To this end SIP servers use information relating to the transport layer, and not specific to the SIP, to route calls or to decide to use ALG applications to change the content of the SDP offers. Such behavior of SIP servers is not covered by the standard.

Generally speaking, the problem linked to interconnecting two heterogeneous user agents (i.e. user agents of different IP types) has not been studied in detail by the telecommunications community. In particular, apart from an ANAT proposal described in RFC 4091 and RFC 4092, which solves part of the problem, there is no IETF document describing the behavior of SIP servers for routing calls connecting two user agents in two different IP environments.

Furthermore, the existing techniques have the following drawbacks:
- using ALG applications and additional functions is not documented; the proxy server PS has no means specified by RFC 3261 to facilitate this task; furthermore, this use of ALG applications and additional adaptation functions burdens the tasks accomplished in the network;
- the proxy server PS must use information from the network layer (also referred to in the present document as the transport layer) to make decisions concerning the service layer; it must therefore take into account considerations other than the source address of the messages, the address used to contact the proxy server or to examine the SDP part; this risks degrading the performance of the proxy, which is configured a priori to process only service level information;
- the solution is not generic: the philosophy of call routing and intervention by the proxy server PS depends on the interconnection solution deployed at the transport level;
- routing calls relies on discriminating clients: to route calls between heterogeneous nodes, the proxy server needs to know the calling and called node types (IPv4, IPv6 or DS); the complexity of recovering this information can degrade call performance.

The work of the inventors has lead them to conclude that, notwithstanding a need that emerges from the above study, in the current state of the art there is no way for a proxy server to successfully route a call to a remote node without first determining the called node type, which explains why most techniques for managing calls between heterogeneous nodes currently under study are insufficient and do not address service requirements enabling heterogeneous calls.

SUMMARY OF THE INVENTION

One object of the present invention is to overcome these drawbacks by providing a sending method that enables a user agent, even a single-version user agent, to announce and/or to discover address types corresponding to different IP environments.

This and other objects are obtained in accordance with one aspect of the present invention directed to a method of transmitting data between at least two nodes of a network, a node being attached to at least one IP environment called its source environment. The method comprises:
- a step of assigning at least one user agent included in one of said nodes a fake address in an IP environment other than said source environment;
- a step of presenting at least said fake address and a source address of said user agent in said source environment when setting up communication with at least one remote node.

Thus the invention relies on an entirely novel and inventive approach to sending data between nodes of a communications network, possibly heterogeneous nodes (i.e. nodes attached to different IP environments, for example IPv4 and IPv6).

One embodiment of the invention assigns a fake address to the user agents and to announce this fake address and the source address of the agent when setting up a communications session with a user agent of another node of the network. Taking the particular example of a communications network comprising some nodes in an IPv4 environment and some nodes in an IPv6 environment, this embodiment of the invention assigns a fake address in the IPv6 environment to a single-version node, for example an IPv4 only node.

In accordance with the usual meaning of the term "fake", the expression "fake address" refers here to an address whose existence is only apparent, in the sense that it does not constitute a user agent representation address and cannot be used in the transport layers of the node to route data streams.

In the particular situation of exchanges conforming to the SIP, one particular variant of the technique of the invention generalizes the use of the ANAT attribute, until now reserved exclusively for nodes of the Dual Stack type, to all nodes and equipments of the service and thus in particular to single-version nodes and equipments, which are attached to only one IP environment (IPv4 only or IPv6 only). As explained in more detail in the remainder of this document, single-version user agents can therefore use the ANAT attribute to give their source address and the fake address assigned to them by the network operator.

The invention could of course apply equally in the situation of three different IP environments, with a third (fake) address assigned to DS clients or two fake addresses assigned to single-version clients.

Note that this assignment can take various forms. The fake address can be configured once and for all on shipping a network equipment or node, assigned by the operator on connecting the equipment to the network, or assigned dynamically by the operator, and for example modified more or less frequently for security reasons.

By means of the presentation of the fake and source addresses of the user agents, it is no longer necessary, for example for a proxy server, to determine the type of a calling or called user agent, taking into account information from the transport layer. In a particular example of a network comprising IPv4 and IPv6 environments, the proxy server therefore no longer needs to determine if a user agent is of IPv4, IPv6 or DS type to route calls between nodes.

According to an embodiment of the invention, this kind of data transmission method further comprises a step of said user agent sending a registration message to a location server, said registration message includes said fake and source addresses of said user agent and a first priority level indicator for one of said addresses.

Thus during the preliminary phase of registration with the location server (also referred to as a registration server or "Registrar"), the user agent communicates both its addresses (fake and source) and indicates which of the two addresses is to be given priority.

In the particular example of the SIP, the user agent sends a "REGISTER" message into which it inserts two "CONTACT" headers for each of the two addresses or a single "CONTACT" header containing both addresses. As explained below, priorities can be indicated using a parameter "q" specified in RFC 3261.

Furthermore, this kind of method then further comprises a step of storing said fake and source addresses and said associated priority level with reference to an identifier of said user agent.

Thus the location server maintains a database grouping the fake and source addresses of each of the user agents registered with it, possibly as well as other useful information. It can therefore, on request, send this information to equipment needing it, such as a proxy server or an intermediate node of the network situated at the frontier between the two different IP environments and responsible for address translation (see below).

According to an advantageous feature, said first priority level indicator assigns a higher priority level to said fake or source address of said user agent corresponding to the IP environment to which is attached a proxy server involved in setting up communication with said remote node.

The address of the user agent that is marked as having priority is therefore of the same IP type as that of the proxy server, and so it is certain that the proxy server can understand it. This priority address is then used for call routing. This prevents the proxy server failing to understand the address used for call routing, which would cause the call to fail.

According to an embodiment of the invention, said presentation step is executed by said user agent in a message of invitation to enter into communication with said remote node and/or in a response message to a message of invitation to enter into communication sent by said remote node.

By transferring some of the processing to the nodes and the terminals, this lightens the tasks executed in the network core, in particular by the proxy server: the user agents are responsible for inserting their fake and source addresses into messages that they send. Thus the proxy server no longer needs to determine the type of a calling or called user agent.

Furthermore, this homogenizes the behavior of all the terminal nodes from the service platform point of view. In the particular example of the SIP, and from the proxy server point of view, all nodes, whether single-version or multi-version, use the service in the same way.

Finally, this address presentation by the user agent proves particularly flexible in execution. If a user agent has a number of source addresses of the same type (for example a number of IPv6 addresses), it can then itself choose, when initializing a call, to show only one of these source addresses, in addition to the fake address assigned to it.

In one variant of the invention, said presentation step is executed by a proxy server involved in setting up communication between said user agent and said remote node in a message of invitation to enter into communication with said remote node sent by said user agent and/or in a response message to a message of invitation to enter into communication sent by said remote node.

This variant can complement the previous embodiment and constitute a control process executed in the proxy server in the event of a failure or malfunction of one of the nodes. Thus if the proxy server determines that a message that is has received does not contain the fake and source addresses of a user agent, it inserts them itself, either because it knows how to determine those addresses itself or after requesting those addresses from the location server with which the user agent is registered.

Substituting this variant for the previous embodiment could also be envisaged, as could the presentation being systematically effected by the proxy server and not by the user agent. However, this approach is not described with reference to the figures in the remainder of this document.

Said invitation and response messages advantageously further comprise a second priority level indicator of one of said addresses, enabling a higher priority level to be assigned to said source address of said user agent.

It is this source address that must really be used in the transport layers for the media streams.

An embodiment of the invention includes a step of converting at least one destination address of a message sent by said user agent to said remote node if said destination address is a fake address and converting said fake address into an associated source address.

Such conversions can be effected in an intermediate node of the network situated at the frontier between two IP environments and serving as a relay between those two environments. In the situation of IPv4 and IPv6 "bubbles", for example, this intermediate node then converts IPv6 packets into IPv4 packets, and vice-versa. This proves particularly useful if the two nodes that enter into communication are attached to two different IP environments (in which situation they are also referred to as heterogeneous): simple address conversion provides for routing traffic without it being necessary to use an ALG application.

Another aspect of the invention relates to a signal for transmitting a message exchanged between nodes of a network, a node being attached to at least one IP environment called the source environment. This kind of signal includes:
    a field containing at least one source address in said source
        environment associated with a user agent in one of said
        nodes;
    a field containing at least one fake address assigned to said
        user agent in an IP environment other than said source
        environment.

Another aspect of the invention relates to a system for transmitting data between nodes of a network, a node being attached to at least one IP environment called the source environment. This system comprises:
    means for assigning a user agent in one of said nodes at
        least one fake address in an IP environment other than
        said source environment;
    means for presentation of at least said fake address and a
        source address of said user agent in said source environment when setting up communication with a remote
        node.

Another aspect of the invention relates to computer programs comprising code instructions for implementing the steps of the above data transmission method when the programs are executed by a processor. Each program relates to the respective steps of the method executed in a user agent, a proxy server or elements of intermediate resources distributed in the network or included in an intermediate node IN situated at the boundary between two different IP environments.

Another aspect of the invention relates to a node of a data transmission network attached to an IP environment called the source environment and including at least one user agent, noteworthy in that it comprises:
    means for storing a fake address assigned to said user agent
        in an IP environment other than said source environment;
    means for presentation of at least said fake address and a
        source address of said user agent in said source environment when setting up communication with at least one
        remote node of said network.

The signal, the system, the node and the computer program of the invention have the same advantages as the method described above.

BRIEF DESCRIPTION OF THE DRAWINGS

Other advantages and features of the invention become more clearly apparent on reading the following description of one particular embodiment of the invention, given by way of illustrative and non-limiting example only, and from the appended drawings, in which.

DETAILED DESCRIPTION OF THE DRAWINGS

In the context of a communications network comprising different IP environments, one aspect of the invention relies on assigning a fake address to a user agent in an IP environment other than the IP environment to which it is attached. This fake address is then presented with the source address of the user agent in messages exchanged when setting up a call to another node of the network.

In one particular embodiment, referred to throughout the remainder of the document, corresponding to setting up SIP communications sessions between heterogeneous nodes of type IPv4, IPv6 or DS, the principle of the invention therefore consists in generalizing the use of the attribute ANAT to single-version clients, i.e. Pure IPv4 or Pure IPv6 clients.

Figure 2A:
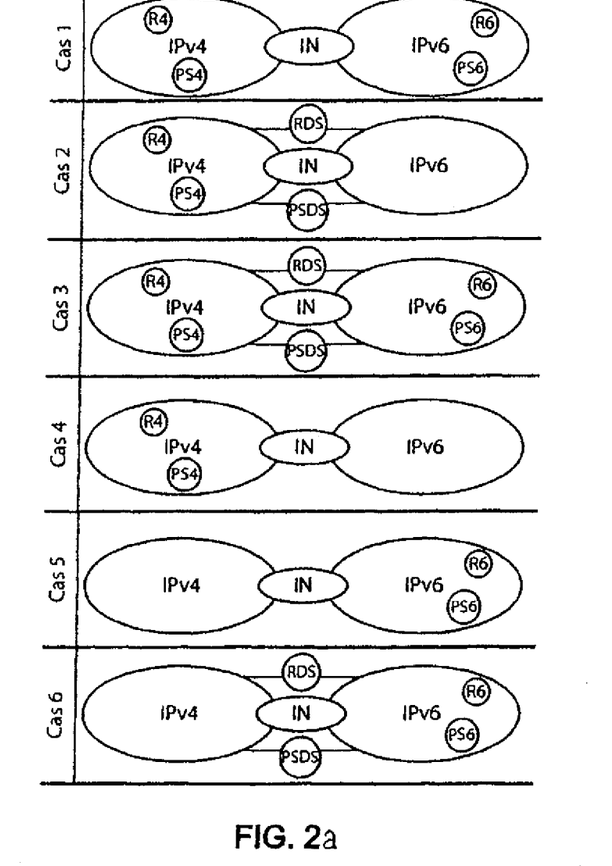
FIG. 2a shows various embodiments of network configurations in which the method of the invention can be applied.

Various network configurations (denoted Case 1 to Case 6 in the figure) in which the technique of the invention can be applied are described first with reference to FIG. 2a, which relates to IPv4 and IPv6 environments linked by an intermediate node IN. The following notation is used in FIG. 2a:

R is a location server (also called a "Registrar");
PS is a proxy server;
the digit 4 indicates that the equipment concerned is connected to the IPv4 network;
the digit 6 indicates that the equipment concerned is connected to the IPv6 network;
the letters DS indicate that the equipment concerned is of the Dual Stack type.

Thus R4 designates a IPv4 location server, for example, and PSDS designates a Dual Stack proxy server, which is therefore shown as attached simultaneously to the IPv4 and IPv6 environments.

In particular:
Case 1 corresponds to the situation in which each IPv4 or IPv6 environment includes a respective location server R4 and R6 and a respective proxy server PS4 and PS6;
Case 2 corresponds to the situation in which the IPv6 environment does not include a location server or a proxy server but does include a Dual Stack location server RDS and a Dual Stack proxy server PSDS;
in Case 3, each IPv4 and IPv6 environment includes a location server R4, R6 and a proxy server PS4, PS6; a Dual Stack location server RDS and a Dual Stack proxy server PSDS are also provided;
in Case 4, only the IPv4 network includes a location server R4 and a proxy server PS4;
Case 5 is a dual version of Case 4;
Case 6 is a dual version of Case 2.

Throughout the remainder of this document, the particular context is that of the above Case 4, where all elements constituting the service platform (namely the location server and the proxy server) are attached to the IPv4 network.

This configuration is that most commonly encountered at the operational level in the services deployed in existing networks. The person skilled in the art will easily understand that the invention is not limited to this particular configuration, however, and that it applies in all the other situations shown in FIG. 2a (Case 1 to 3, 5, 6).

Figure 3:
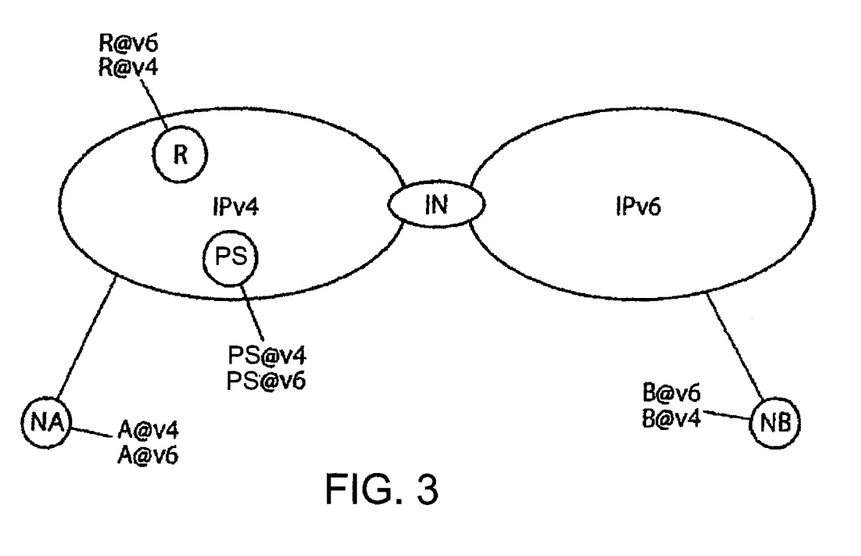
FIG. 3 shows an example of a network to which the invention can be applied, comprising an IPv4 network to which a user agent NA is attached and a IPv6 network to which a user agent NB is attached.

This configuration is shown in more detail in FIG. 3, in which an SIP node NA, a proxy server PS and a location server R are attached to an IPv4 network, linked by an intermediate node IN to an IPv6 network to which a SIP node NB is attached.

The method of the invention makes the following modifications to the existing elements:

An IPv6 fake address is assigned to each of the elements constituting the SIP service platform, namely the proxy server PS and the location server R. Each of these addresses represents the corresponding service element in the IPv6 environment. Here, those elements are IPv4 only and therefore do not manage IPv6 addresses at the transport level. They can nevertheless decode and understand IPv6 addresses at the application level, i.e. at the SIP stack level.

Each IPv4 SIP node (here NA) is assigned an IPv6 fake address and each IPv6 SIP node (here NB) is assigned an IPv4 fake address. However, this does not turn the SIP NA and NB into Dual Stack clients. In the method of the invention, these fake addresses are used only by the SIP service. They are not used by the transport layers of the corresponding client.

Assigning addresses is constrained so that there exist a function f( ) and a function g( ) such that @v4=f(@v6) and @v6=g(@v4), where @v4 and @v6 are IPv4 and IPv6 addresses, respectively. The definition of these functions is left to the operator when implementing the service, for example mapped IPv4 addresses or compatible IPv4 addresses can be mentioned, these two formats being described in the IPv6 standards.

Mapped IPv4 addresses are IPv6 addresses represented in the form::FFFF:a.b.c.d where a.b.c.d is an IPv4 address. Compatible IPv4 addresses are IPv6 addresses represented in the form: a.b.c.d where a.b.c.d is an IPv4 address.

The functions f and g must be carefully chosen to limit the impact on routing functions.

Another constraint of the method of the invention results from the need to announce in the routing plan the addresses previously identified: the IPv4 fake addresses assigned to IPv6 SIP nodes can be announced in the IPv4 environment and vice-versa. Moreover, the IPv6 fake addresses assigned to the service elements such as the location server and the proxy server must be announced in the IPv6 environment.

To facilitate the following description, it is assumed below that all elements functionally required to implement the present invention are present in the intermediate node IN represented at the frontier between the IPv4 and IPv6 environments. Note, however, that this is a simplification for purposes of representation and that all functions, processes, operations handled by the intermediate node IN can equally well be distributed within the network according to the implementation of the service set up by the network operator.

The intermediate node IN typically serves as a relay between the IPv4 and IPv6 environments. For example, the intermediate node IN receives all traffic from IPv6 clients going to IPv6 addresses from the registrar server and the proxy server. The intermediate node IN then converts IPv6 packets into IPv4 packets using the functions f( ) and g( ) referred to above. This conversion can be effected by the intermediate node IN itself if it knows these functions directly; the intermediate node IN can also send a request to the location server R, which knows these functions or the resultant of these functions.

The above description makes it clear that the method of the invention enables communication between SIP nodes NA and NB each belonging to an IP source environment of a first IP type, for example the IPv4 type, respectively a second IP type, such as the IPv6 type, the aforementioned source IP environments being foreign to each other.

The node NA has an IP address in the first IP, for example IPv4, environment, denoted A@v4, the node NB belonging to the second type, for example IPv6 type, of IP environment having an IP source address, denoted B@v6, of a type foreign to that of the source address A@v4 of the SIP node NA.

The phase of registering an SIP node NA with a location server before setting up a communications session with a remote node NB is described below with reference to FIG. 2c.

During registration, any IPv4, respectively IPv6, SIP terminal implementing the method of the invention must have its two addresses (IPv4 source address respectively IPv6 real address and IPv6 respectively IPv4 fake address) assigned by the service for its own use.

To this end, the client uses the "REGISTER" method, for example, in which it inserts two "CONTACT" headers, one for each address, or a single "CONTACT" header with both IPv4 and IPv6 addresses.

For the situation described here (Case 4), it is assumed that, the elements of the SIP service are resident in the IPv4 environment. Consequently, the IPv4 addresses are advantageously marked as having priority, typically in registration messages, regardless of the nature of the IPv4 or IPv6 client. This marking is effected in the "CONTACT" field of the SIP requests, using the parameter "q" in the ABNF description of the "CONTACT" field as defined by RFC 3162 and set out in table T1 below:

TABLE T1

| | |
|---|---|
| Contact = | ("Contact" / "m" ) HCOLON |
| ( STAR / (contact-param *(COMMA contact-param))) | |
| contact-param = | (name-addr / addr-spec) *(SEMI contact-params) |
| name-addr = | [ display-name ] LAQUOT addr-spec RAQUOT |
| addr-spec = | SIP-URI / SIPS-URI / absoluteURI |
| display-name = | *(token LWS)/ quoted-string |
| contact-params = | c-p-q / c-p-expires |
| | / contact-extension |
| c-p-q = | "q" EQUAL qvalue |
| c-p-expires = | "expires" EQUAL delta-seconds |
| contact-extension = | generic-param |
| delta-seconds = | 1*DIGIT |

Example of Registering an IPv4 User Agent UA (FIG. 2c):

Assuming that the SIP node NA is an IPv4 user agent UA whose source address A@v4=171.5.25.2 and that the IPv6 registration address assigned by the method of the invention is A@v6=ipv6A, the following SIP messages are exchanged during registration:

During a step 20, the node NA sends a registration message "REGISTER" to the address R@v4 of the registration server R as shown in table T2:

TABLE T2

| | |
|---|---|
| "REGISTER" | r.example.com SIP/2.0 |
| Via: | SIP/2.0/TCP |
| | 171.5.25.2:5060;branch=z9hG4bKnashds7 |
| Max-Forwards: | 70 |
| From: | A <sip:A@example.com>;tag=a73kszlfl |
| To: | A <sip:A@ example.com>;tag=jqoiweu75 |
| Call-ID: | 1j9FpLxk3uxtm8tn@example.com |
| CSeq: | 1 "REGISTER" |
| Contact: | <sip:A@171.5.25.2>; q=0.7; expires=3600 |
| Contact: | <sip:A@[ipv6A]>; q=0.3; expires=3600 |
| Content-Length: | 0 |

During a step 21, the registration server R responds with a "200 OK" message to the address A@v4 of the node NA as shown in table T3:

TABLE T3

| | |
|---|---|
| | SIP/2.0 200 OK |
| Via: | SIP/2.0/TCP |
| | 171.5.25.2:5060;branch=z9hG4bKnashds7 |
| From: | A <sip:A@example.com>;tag=a73kszlfl |
| To: | A <sip:A@ example.com>;tag=jqoiweu75 |
| Call-ID: | 1j9FpLxk3uxtm8tn@example.com |
| CSeq: | 1 "REGISTER" |
| Contact: | <sip:A@171.5.25.2>; q=0.7; expires=3600 |
| Contact: | <sip:A@[ipv6A]>; q=0.3; expires=3600 |
| Content-Length: | 0 |

Example of Registering an IPv6 User Agent UA:

Assuming that the SIP node NB is an IPv6 user agent UA whose source address is B@v6=2001:688:1ffb:ff80::2 and that the IPv4 fake address assigned by the SIP service operator is B@v4=ipv4B, the following SIP messages are exchanged during registration:

(1) The node NB sends a registration message "REGISTER" to the registration server R as shown in table T4:

TABLE T4

| | |
|---|---|
| "REGISTER" | r.example.com SIP/2.0 |
| Via: | SIP/2.0/TCP |
| | 171.5.25.2:5060;branch=z9hG4bKnashds7 |
| Max-Forwards: | 70 |
| From: | B <sip:B@example.com>;tag=a73kszlfl |
| To: | B <sip:B@example.com>;tag=jqoiweu75 |
| Call-ID: | 1j9FpLxk3uxtm8tn@example.com |
| CSeq: | 1 "REGISTER" |
| Contact: | <sip:B@[2001:688:1ffb:ff80::2]>; q=0.1; expires=3600 |
| Contact: | <sip:B@ipv4B>; q=0.7; expires=3600 |
| Content-Length: | 0 |

(2) The registration server R responds with a "200 OK" message to the node NB as shown in table T5:

TABLE T5

| | |
|---|---|
| | SIP/2.0 200 OK |
| Via: | SIP/2.0/TCP [2001:688:1ffb:ff80::2]:5060; branch=z9hG4bKnashds7; received=ipv4B |
| From: | B <sip:B@example.com>;tag=a73kszlfl |

TABLE T5-continued

| | SIP/2.0 200 OK |
|---|---|
| To: | B <sip:B@example.com>;tag=jqoiweu75 |
| Call-ID: | 1j9FpLxk3uxtm8tn@example.com |
| CSeq: | 1 "REGISTER" |
| Contact: | <sip:B@[2001:688:1ffb:ff80::2]>; q=0.1; expires=3600 |
| Contact: | <sip:B@ipv4B>; q=0.7; expires=3600 |
| Content-Length: | 0 |

Note that, for an IPv6 SIP node and for the registration message "REGISTER", the intermediate node is seen as a simple IPv4-IPv6 relay. This avoids any processing linked to the transmission service in the network. To lighten the load of the intermediate node IN, it is preferable for the IPv6 SIP node not to use the "hard" IPv6 address of the location server R, but instead its complete domain name (fully qualified domain name (FQDN)).

The steps of the method of the invention executed to set up communication between two heterogeneous SIP nodes, i.e. two nodes attached to IP networks of different types, are described below with reference to FIG. 2b.

In the method of the invention, during a step A, each node and each element (node NA, node NB, for example) is assigned a fake IP address in the IP environment foreign to the source IP environment to which the SIP node or element concerned belongs. Thus the fake address is of an IP type foreign to the source IP environment of the node or element concerned. This step A of assigning fake addresses is carried out at the initiative of the operator. It can be effected during construction of a node or an element, during its connection to the network, or dynamically (for example by changing the functions f and g more or less frequently, for security reasons).

Figure 2B:
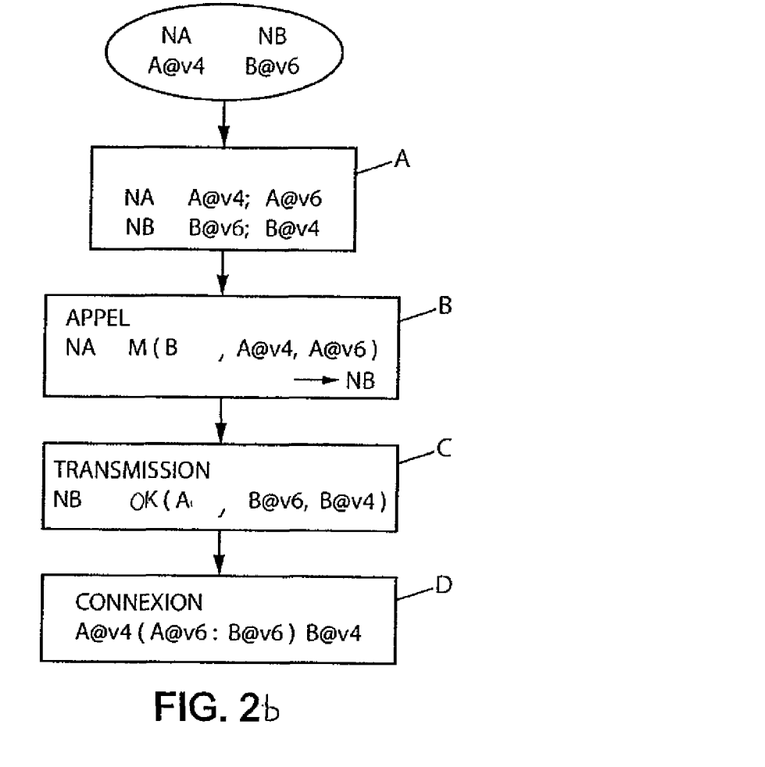
FIG. 2b shows the main steps of the method of an embodiment of the invention in the form of a flowchart.
Figure 2C:
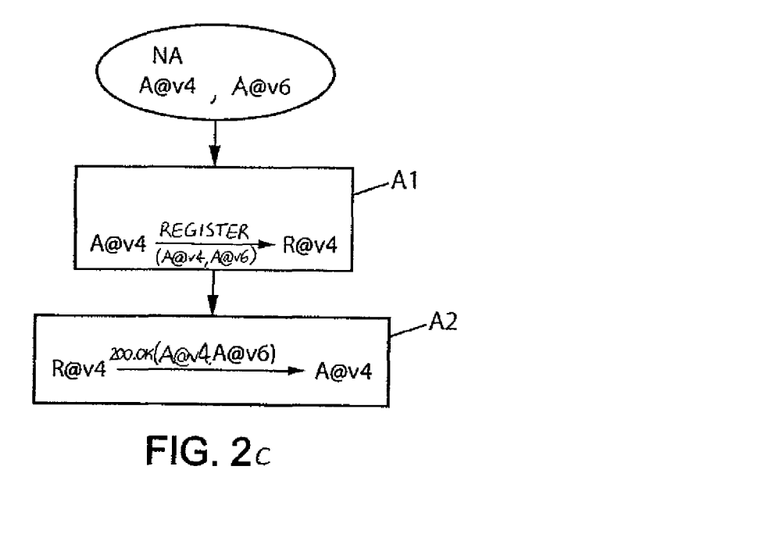
FIG. 2c shows in more detail the registration steps from the FIG. 2a flowchart.

As step A in FIG. 2b shows, the following are available:
the source address A@v4 of the node NA and the fake address A@v6 assigned to it;
the source address B@v6 of the node NB and the fake address B@v4 assigned to it.

The aforementioned step A is followed by a step B of launching a call procedure from the node NA or NB, called the calling node, for example the node NA in FIG. 2b, to another SIP node, here the node NB, by sending from the calling node NA to the called node NB an invitation to enter into communication containing the source address and the fake address.

Obviously this invitation message, also called a call message, is sent via the node IN, as described below.

On reception of the call message by the called node NB, the called node NB sends the calling node NA a call acceptance message containing the source address B@v6 and the fake address B@v4 of the called node NB.

In step B in FIG. 2b, the called message is denoted M(B, A@v4, A@v6) to indicate that it is for the called node NB and contains the fake and source addresses of the calling node NA.

Similarly, in the step C, the call acceptance message is arbitrarily denoted OK(A, B@v6, B@v4) to indicate that it is for the calling node NA and contains the fake and source addresses of the called node NB.

Step C is then followed by a step D of setting up the connection between the calling node NA and the called node NB. This is effected in the intermediate node IN by putting the source and fake addresses into transitive correspondence to ensure translation of the addresses in both source IP environments of the first, respectively second, IP type.

For this reason, in the step D in FIG. 2a, the connection procedure is denoted A@v4 (A@v6:B@v6) B@v4.

It is therefore clear that the connection is effected under the calling node source IP environment protocol, which takes into account only the address B@v4 of the called SIP node, whereas, in the final analysis, to send its call acceptance message the called node NB uses only the representation address A@v6 of the calling node NA in the second type of IP environment (IPv6).

In one particular embodiment of the invention relying on generalization of the use of the attribute ANAT to all SIP nodes of a network, to call a remote node any IPv4, respectively IPv6, SIP node must therefore process the attribute ANAT of the SIP messages to show its two addresses: its IPv4 source address, respectively IPv6 real address, and its IPv6, respectively IPv4, fake address assigned by the transmission service for its own use.

During a call, the SIP node must use the INVITE method which uses the attribute ANAT in the SDP part. The present invention uses the "mid" field to specify the priority of the addresses announced in the ANAT field. This parameter indicates the preference in respect of the addresses listed in the SDP message, and is preferably coded in increasing address order. An IPv4, respectively IPv6, SIP node having its IPv4, respectively IPv6, source address and the IPv6, respectively IPv4, fake address supplied by the SIP transmission server typically sets the value of the "mid" field to 1 for the IPv4, respectively IPv6, source address and to 2 for the IPv6, respectively IPv4, representation address.

This "mid" field is used in the event of exchanges with Dual Stack (DS) SIP nodes. This is illustrated for the SIP node NA, for example, for which only the SDP part is represented in table T6:

TABLE T6

| | |
|---|---|
| v = | 0 |
| o = | A 280744730 28977631 IN IP4 host.example.com |
| s = | |
| t = | 0 0 |
| a = | group:ANAT 1 2 |
| m = | audio 25000 RTP/AVP 0 |
| c = | IN IP6 2001:DB8::1 |
| a = | mid:2 |
| m = | audio 22334 RTP/AVP 0 |
| c = | IN IP4 192.0.2.1 |
| a = | mid:1 |

When the called SIP node NB receives this "INVITE" message and accepts the call, it sends back a "200 OK" response message. Any client implementing the method of the invention must also insert into its "200 OK" message two ANAT attributes giving its two addresses and their coding in the "mid" field. For example, the SIP node NB responds to the "INVITE" message with the message represented in table T7, of which only the SDP part is shown:

TABLE T7

| | |
|---|---|
| v = | 0 |
| o = | B 280744730 28977631 IN IP6 B.example.com |
| s = | |
| t = | 0 0 |
| a = | group:ANAT 1 2 |
| m = | audio 25000 RTP/AVP 0 |
| c = | IN IP6 2001:688:1ffb:ff80::2 |
| a = | mid:1 |
| m = | audio 22334 RTP/AVP 0 |
| c = | IN IP4 172.26.25.2 |
| a = | mid:2 |

Because of this, each of the two SIP nodes NA and NB has both the IPv4 and IPv6 addresses of its counterpart. To set up the call, i.e. to enable transmission of RTP streams, each SIP node uses only the version of the IP corresponding to the IP environment in which it is located. This applies when the clients are either of Pure IPv4 type or Pure IPv6 type. In concrete terms, any client this concerns systematically uses its source address and the address of the remote client whose type corresponds to the type of the address for which the client concerned has set the "mid" field to the lowest value, which ensures consistency of service.

Thus the IPv4, respectively IPv6, node sends RTP traffic to the IPv4, respectively IPv6, fake address of its counterpart. This method optimizes all aspects of call processing because, assuming two SIP nodes with the same IP environment are exchanging traffic, routing and transmission of data are effected directly. The method of the invention does not distort the basic data transmission model and does not impose the use of intermediaries if that is not necessary.

If the two SIP nodes are effectively heterogeneous (a Pure IPv4 terminal and a Pure IPv6 SIP terminal), RTP traffic is simply routed to the intermediate node IN, which simply serves as an IPv4-IPv6 relay. No ALG application is needed and the interworking service is transparent for the proxy server.

The intermediate node IN (or the corresponding resources if distributed in the network and implementing the functions of the invention) implements and knows the functions f and g and also knows the correspondence between a given network prefix and the function to be used if the function is deployed to cover a number of SIP operator domains and therefore a number of f/g functions. In contrast, injections in the routing plane are effected in the IPv4 intermediate node IN and the IPv6 intermediate node IN.

Dual-stack (DS) clients:
The method of the invention generalizes use of the attribute ANAT for IPv4 and IPv6 SIP nodes in order to enhance interworking between heterogeneous clients. However, the aim of the aforementioned method being to enable interworking between SIP nodes of all types, it is naturally advantageous to integrate Dual Stack SIP nodes into the process.

To ensure totally-transparent interworking, it is necessary to verify that:
the Dual Stack SIP nodes implement and use the attribute ANAT as described in RFC 4091 and RFC 4092, to which is added the obligatory use of the "mid" field;
by assumption (case 4 in FIG. 2a), the elements of the SIP service (location server and proxy server) have been placed in the IPv4 environment. Consequently, the Dual Stack SIP nodes must use only their IPv4 address and IPv4 transport to contact the registration server and/or the proxy server; under the opposite assumption of a IPv6 environment service, the DS nodes must use their IPv6 address;
Dual Stack SIP nodes having a priori no preference between the addresses available to them, they use the attribute "mid" in the field ANAT in the following manner:
a Dual Stack SIP node at the source of the call may not assign a value to the attribute "mid" in the INVITE message or set it to equal values for its IPv4 and IPv6 addresses;
a Dual Stack SIP node that accepts an incoming call sends a "200 OK" response message with the value of the "mid" field set as follows:

if the value of the "mid" field was set to different values in the INVITE message received, the caller is therefore a pure IPv4 or pure IPv6 SIP node, and the Dual Stack SIP node conforms to this value to format its "200 OK" response message with the same priority;
if the value of the "mid" field was not set, or set to identical values in the INVITE message received, the called Dual Stack SIP node makes a choice to set the value of the "mid" field in the "200 OK" response message that it sends; how this choice is made is not part of the present invention and can therefore be implemented at will;
a Dual Stack SIP node that receives a "200 OK" response message in response to a INVITE message that it sent systematically conforms itself to the value of the "mid" field received in the "200 OK" response message.

Control process:
It can happen that some SIP nodes do not obey the rules stated above, for example in the event of temporary replacement of a faulty terminal.

The attribute ANAT is then not coded by the user agent of the corresponding SIP node. To alleviate any dysfunction in this situation, optimization measures may be taken to monitor and prevent this kind of error.

Such optimization can advantageously consist in carrying out a check in the proxy server:
if the field ANAT is present, the proxy server does not modify it;
the proxy server adds a declaration sdp-anat, setting the corresponding fields to the IPv4 source address and the representation IPv6 address corresponding to the calling SIP node; the proxy server can recover these addresses by sending a query to the registration server or have direct access to them if it knows the functions f( ) and g( );
the proxy server must also code the "mid" field according to the IP version of the SIP node; for an IPv4 respectively IPv6 SIP node, the proxy server gives priority to the IPv4 respectively IPv6 source address.

Figure 4:
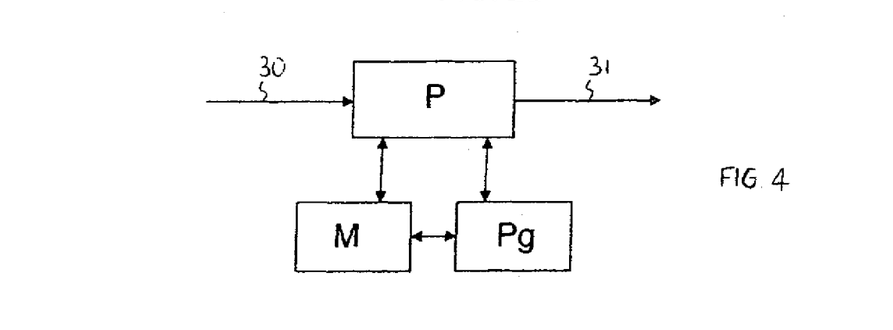
FIG. 4 is a block diagram of a node of the invention.

Finally, FIG. 4 is a block diagram of a SIP node of the invention. This kind of SIP node includes, in addition to means known in the art, a central unit P, equipped with a microprocessor, for example, a memory M, for example a random access memory (RAM), and a software module Pg. At initialization time, the instructions of the software Pg are loaded from the memory M to be executed by the microprocessor of the central unit P, for example.

This kind of SIP node contains one or more user agents UA, each of which has a source address in the IP environment to which the node is attached, for example IPv4. This source address is stored in the memory M. The network operator also assigns a fake address 30 to the user agents in the IPv6 environment. This fake address is also stored in the memory M.

On the instructions of the software module Pg, the central unit P effects the presentation 31 of the fake and source addresses of the user agent concerned, for example on sending a registration message to a location server, or on sending messages exchanged in the context of setting up communication with a remote node of the network. The central unit also sets the corresponding priority indicators in these messages.

The invention claimed is:
1. A method of transmitting data between nodes of a network, the nodes of the network comprising a calling node attached to a source IP environment, the source IP environ- ment using addresses of a first IP type, and a remote node attached to a remote IP environment, wherein the method comprises:

assigning to a user agent, included in said calling node, a fake address of a second IP type;

presenting to said remote node at least said fake address and a source address of said user agent in said source IP environment, the source address being of said first IP type, when setting up communication with said remote node;

transmitting a message via the network from said user agent to said remote node using the address of the calling node in the source IP environment as a message source address; and converting at least one destination address of a message sent by said user agent to said remote node if said destination address is a fake address, the converting comprising replacing said fake address with an associated address in the source environment of the remote node.

2. The data transmission method according to claim 1, further comprising a step of said user agent sending a registration message to a location server, wherein said registration message includes at least said fake and source addresses of said user agent and at least one first priority level indicator for one of said addresses.

3. The transmission method according to claim 2, further comprising a step of storing at least said fake and source addresses and said associated priority level with reference to an identifier of said user agent.

4. The transmission method according to claim 2, wherein said first priority level indicator assigns a higher priority level to said fake or source address of said user agent corresponding to the IP environment to which is attached a proxy server involved in setting up said communication with said remote node.

5. The transmission method according to claim 1, wherein said presentation step is executed by said user agent in at least one message of invitation to enter into communication with said remote node and/or in at least one response message to a message of invitation to enter into communication sent by said remote node.

6. The transmission method according to claim 1, wherein said presentation step is executed by a proxy server involved in setting up said communication between said user agent and said remote node in at least one message of invitation to enter into communication with said remote node sent by said user agent and/or in at least one response message to a message of invitation to enter into communication sent by said remote node.

7. The transmission method according to claim 5, wherein said invitation and response messages further comprise at least one second priority level indicator of one said addresses, enabling a higher priority level to be assigned to said source address of said user agent.

8. The transmission method according to claim 1, wherein said first IP type is IPv4, and said second IP type is IPv6.

9. The transmission method according to claim 1, wherein said first IP type is IPv6, and said second IP type is IPv4.

10. The transmission method according to claim 1, wherein said presentation step is executed by said user agent, or by a proxy server involved in setting up said communication between said user agent and said remote node, in at least one message of invitation to enter into communication with said remote node sent by said user agent and/or in at least one response message to a message of invitation to enter into communication sent by said remote node.

11. The transmission method according to claim 1, wherein:
said first IP type is IPv4, and said second IP type is IPv6,
each IPv4 node (NA) is assigned an IPv6 fake address and each IPv6 node (NB) is assigned an IPv4 fake address, and
the IPv4 nodes (NA) decode IPv6 fake addresses in the application layer and do not manage IPv6 addresses in the transport layer.

12. A system for transmitting data between nodes of a network, the nodes of the network comprising a calling node attached to a source IP environment, the source IP environment using addresses of a first IP type, and a remote node attached to a remote IP environment, wherein the system comprises:

means for assigning to a user agent, included in said calling node, a fake address of a second IP type;

means for presentation to said remote node of said fake address and a source address of said user agent in said source IP environment, the source address being of said first IP type, when setting up communication with said remote node;

means for transmitting a message via the network from said user agent to said remote node using the address of the calling node in the source IP environment as a message source address; and means for converting at least one destination address of a message sent by said user agent to said remote node if said destination address is a fake address, the converting comprising replacing said fake address with an associated address in the source environment of the remote node.

13. The system of claim 12, wherein:
said first IP type is IPv4, and said second IP type is IPv6,
each IPv4 node (NA) is assigned an IPv6 fake address and each IPv6 node (NB) is assigned an IPv4 fake address, and
the IPv4 nodes (NA) decode IPv6 fake addresses in the application layer and do not manage IPv6 addresses in the transport layer.

14. A non-transitory computer-readable medium storing a computer program comprising code instructions for executing steps of the data transmission method according to claim 1 when said program is executed by a processor.

15. A calling node of a data transmission network attached to a source IP environment, the source IP environment using addresses of a first IP type, the calling node including at least one user agent, wherein the calling node comprises:

a processor;

memory connected to the processor for storing at least one fake address, of a second IP type, assigned to said user agent;

means for presentation, to a remote node attached to a remote IP environment, of at least said fake address and a source address of said user agent in said source IP environment, the source address being of said first IP type, when setting up communication with said remote node; and means for transmitting or forwarding a message via the network from said user agent to said remote node using the address of the calling node in the source IP environment as a message source address, wherein at least one destination address of a message sent by said user agent to said remote node is adapted to be converted, if said destination address is a fake address, to replace said fake address with an associated address in the source environment of the remote node.

16. The calling node of claim 15, wherein:

said first IP type is IPv4, and said second IP type is IPv6, each IPv4 node (NA) is assigned an IPv6 fake address and each IPv6 node (NB) is assigned an IPv4 fake address, and the IPv4 nodes (NA) decode IPv6 fake addresses in the application layer and do not manage IPv6 addresses in the transport layer.

\* \* \* \* \*